(12) United States Patent
Baumont et al.

(10) Patent No.: US 8,870,218 B2
(45) Date of Patent: Oct. 28, 2014

(54) MOTOR VEHICLE LINING ELEMENT COMPRISING A FRAME FOR THE DEPLOYMENT OF AN AIRBAG

(75) Inventors: Sébastien Baumont, Bornel (FR); Christophe Coupe, Crillon (FR); Jérome Meziere, Bois Colombes (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/991,169

(22) PCT Filed: Nov. 28, 2011

(86) PCT No.: PCT/EP2011/071113
§ 371 (c)(1),
(2), (4) Date: Sep. 16, 2013

(87) PCT Pub. No.: WO2012/072537
PCT Pub. Date: Jun. 7, 2012

(65) Prior Publication Data
US 2013/0341895 A1 Dec. 26, 2013

(30) Foreign Application Priority Data
Dec. 2, 2010 (FR) ...................................... 10 60035

(51) Int. Cl.
*B60R 21/20* (2011.01)
(52) U.S. Cl.
USPC ....................................................... 280/728.3
(58) Field of Classification Search
CPC .. B60R 21/205; B60R 21/2165; B60R 21/215
USPC .............................................. 280/728.3, 732
See application file for complete search history.

(56) References Cited

U.S. PATENT DOCUMENTS

| 5,433,474 A | 7/1995 | Farrington et al. |
| 8,511,706 B2 * | 8/2013 | Kalisz .......................... 280/728.2 |
| 2008/0018081 A1 * | 1/2008 | Yang et al. ................. 280/728.2 |
| 2010/0213691 A1 * | 8/2010 | Schupbach ................ 280/728.3 |

FOREIGN PATENT DOCUMENTS

| EP | 0819584 A2 | 1/1998 |
| EP | 1199226 A2 | 4/2002 |
| FR | 2904281 A1 | 2/2008 |

OTHER PUBLICATIONS

International Search Report for application No. PCT/EP2011/071113, dated Mar. 8, 2012, 2 pages (translated).

* cited by examiner

*Primary Examiner* — Faye M. Fleming
(74) *Attorney, Agent, or Firm* — Reising Ethington

(57) ABSTRACT

The lining element (10) for a motor vehicle comprises a rigid support element (12) and a covering element (14) covering the support element (12), the covering element (14) comprising a skin (26) intended to be visible to an occupant of the passenger compartment of the motor vehicle, the support element (12) defining at least one opening (22) for the deployment of an airbag toward the outside of the lining element (10), a frame (16) being connected to the support element (12) and extending around the periphery of said opening (22), the frame (16) carrying a continuous rib (34) extending from the frame (16) into the covering element (14), along at least a part of the periphery of the opening (22). The rib (34) is connected to the frame (16) by a weakening line (50) enabling the deformation of the rib (34) with respect to the frame (16) in the event of an impact against the lining element (10).

16 Claims, 3 Drawing Sheets

MOTOR VEHICLE LINING ELEMENT COMPRISING A FRAME FOR THE DEPLOYMENT OF AN AIRBAG

TECHNICAL FIELD

The present invention relates to a motor vehicle lining element for a vehicle dashboard.

BACKGROUND

It is currently common to equip motor vehicles with airbag devices. Such devices are generally housed in vehicle dashboards, while being hidden under a lining element covering the dashboard. Such a lining element may be of the type comprising a rigid support element and a covering element covering the support element, the covering element comprising a skin intended to be visible to an occupant of the passenger compartment of the motor vehicle, the support element defining at least one opening for the deployment of an airbag toward the outside of the lining element, a frame being connected to the support element and extending around the periphery of the opening, the frame carrying a continuous rib extending from the frame into the covering element, along at least a part of the periphery of the opening.

When it is deployed, the airbag must therefore pass through the lining element covering it, which is generally done by tearing of part of the covering element, thereby freeing a passage for the airbag toward the passenger compartment. The lining element must therefore be designed to tear cleanly so as to allow an optimal deployment of the airbag and prevent material from being projected from the covering element into the passenger compartment, those projections potentially hurting the occupants of the vehicle.

To that end, it is known to create a weakening area in the covering element so as to limit tearing. When the airbag is deployed, it acts on a flap which in turn acts on the weakening area, which makes it possible to control the tearing.

However, the tearing is not always optimally controlled and risks often remain of projections entering the passenger compartment.

It is known from US-2009/0309338 to provide a rigid rib extending over at least part of the periphery of the deployment opening of the airbag, to improve the tearing of the covering element during deployment of the airbag.

However, there is a risk that, in case of impact against the surface of the lining element, for example if the head of an occupant of the vehicle collides with the lining element, the rib sections the covering element and emerges in said outer surface, which would risk causing injuries to that occupant.

SUMMARY

One aim of the invention is to offset these drawbacks of the state of the art by proposing a motor vehicle lining element in which the tearing of the covering element during deployment of the airbag is done in a controlled manner, so as to avoid projections of material from the lining element into the passenger compartment, the lining element being adapted not to injure the occupants of the vehicle in case of impact against its outer surface.

To that end, the invention relates to a lining element of the aforementioned type, wherein the rib is connected to the frame by a weakening line enabling the deformation of the rib with respect to the frame in the event of an impact against the lining element.

The lining element according to the invention may comprise one or more of the following features, considered alone or according to any technically possible combination(s):

the weakening line comprises alternating material bridges, connecting the rib to the frame, and windows, each window being defined by the rib, the frame, and at least one material bridge;

each material bridge comprises a first portion, extending substantially in the extension of the frame, and a second portion, extending substantially in the extension of the rib, the two portions being directly in contact with each other and forming a non-zero angle between them;

the rib comprises a folded end portion;

the angle formed between the folded end portion and a base of the rib, connected to the frame, is comprised between 0° and 80°;

the angle formed between the folded end portion and a base of the rib, connected to the frame, is comprised between 100° and 175°;

the end portion is folded toward the opening;

the end portion is folded toward the frame;

the rib comprises a base connected to the frame, and the angle formed between the frame and the base of the rib is comprised between 5° and 80°, or between 100° and 175°;

the rib is connected to the frame along a peripheral edge of the frame.

BRIEF DESCRIPTION OF THE DRAWINGS

Other features and advantages of the invention will appear more clearly upon reading the following description, provided solely as an example and done in reference to the appended drawings, in which.

DETAILED DESCRIPTION

In the description, the lining element 10 will be described as a dashboard lining element. It is understood that such an element can line another element of the vehicle, such as a door interior, a seat, a steering wheel, or another part.

Figure 1:
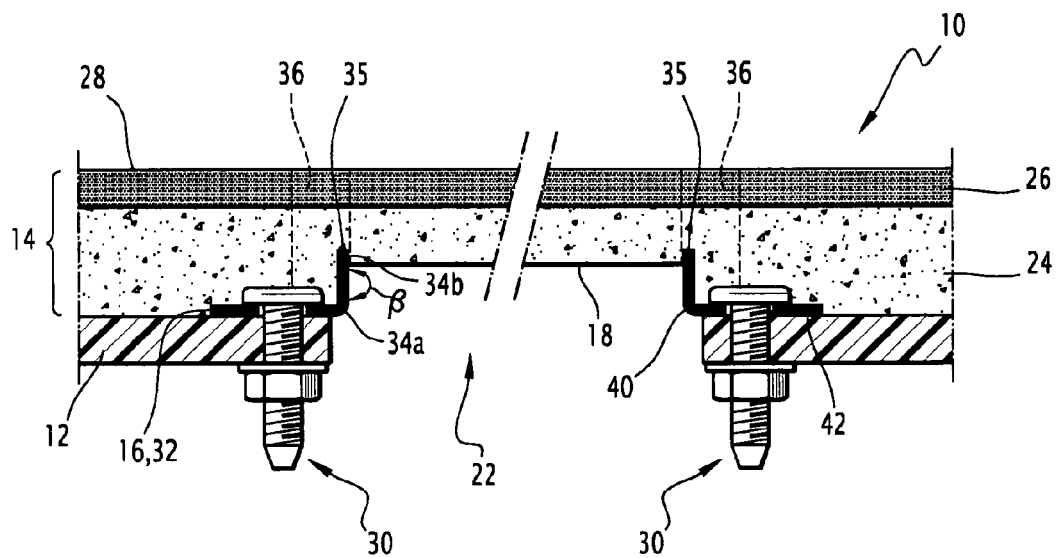
FIG. 1 is a diagrammatic cross-sectional view of a lining element according to the invention.

As shown in FIG. 1, the lining element 10 comprises a rigid support element 12, a flexible covering element 14, a rigid frame 16 connected to the support element 12, and a flap 18.

The support element 12 is for example a plastic-based rigid insert forming the body of a dashboard. It delimits a through opening 22 for the deployment of an airbag device (not shown). The opening 22 for example has a substantially rectangular shape.

The covering element 14 is intended to impart a pleasant feel and visual appearance to the dashboard. It covers the support element 12, the frame 16 and the flap 18. In the illustrated example, it is made up of a layer of foam 24 covered with a skin 26.

The foam making up the layer of foam 24 is for example polyurethane. The skin 26 has an outer surface 28 intended to be visible by occupants of the passenger compartment of the motor vehicle.

Alternatively, the covering element 14 is made up of the skin 26 alone.

The flap 18 covers the opening 22 and makes it possible to tear the covering element 14 when the airbag is deployed. Preferably, the flap 18 is articulated to the frame 16 by one of its edges so as to lift upon deployment of the airbag device. The flap 18 has a sufficient rigidity to transmit the deployment energy from the airbag to its free end, so as to tear the covering element 14. To that end, the flap 18 is for example made from metal.

The frame 16 is connected to the support element 12 and extends over the periphery of the opening 22. Preferably, the frame 16 surrounds the opening 22. It is inserted between the support element 12 and the covering element 14.

In the illustrated example, the frame 16 is fixed to the support element 12 using fastening means 30, such as bolts, rivets or clips, and is typically made from metal. Alternatively, the frame 16 is integral with the support element 12.

The frame 16 comprises a ribbed part 32 and a portion (not shown) for articulating with the flap 18. Preferably, the ribbed part 32 and the articulation portion are integral. Alternatively, the ribbed part 32 and the articulation portion are formed by two distinct parts.

The ribbed part 32 extends between two end portions 32a, 32b. Preferably, each end portion 32a, 32b is in contact with the articulation part.

The ribbed part 32 bears a continuous rib 34 that extends from the frame 16, substantially perpendicular thereto, in the covering element 14, without emerging in the outer surface 28. The rib 34 is integral with the frame 16.

Preferably, the rib 34 extends from one end portion 32a to the other end portion 32b.

The rib 34 comprises a base 34a connected to the frame 16, and an end portion 34b, extending from the base 34a into the covering element 14. The end portion 34b forms an angle β with the base 34a. In the example illustrated in FIGS. 1 to 3, the angle β is substantially equal to 180° and the end portion 34b delimits an upper end 35 of the rib 34.

It will be noted that the term "upper" used here should be understood in an orientation going from the support element 12 toward the outer surface 28.

In the illustrated example, the rib 34 extends substantially along half of the periphery of the opening 22. Alternatively, the rib 34 extends over three of the four sides of the opening 22.

A weakening area 36 is thus defined in the covering element 14, above the ribbed part 32. The weakening area 36 can also be formed by a precut in the foam layer 24 or in the skin 26, said precut defining the weakening area 36 of the covering element 14.

Preferably, the rib 34 extends along an inner 40 or outer 42 peripheral edge of the frame 16, for example, as shown, along an inner peripheral edge 40. In the illustrated example, the inner peripheral edge 40 borders the edge of the opening 22, the outer peripheral edge 42 extending on the support element 12, opposite the inner peripheral edge 40.

Alternatively, the rib 34 extends between the inner 40 and outer 42 peripheral edges of the frame 16.

Figure 2:
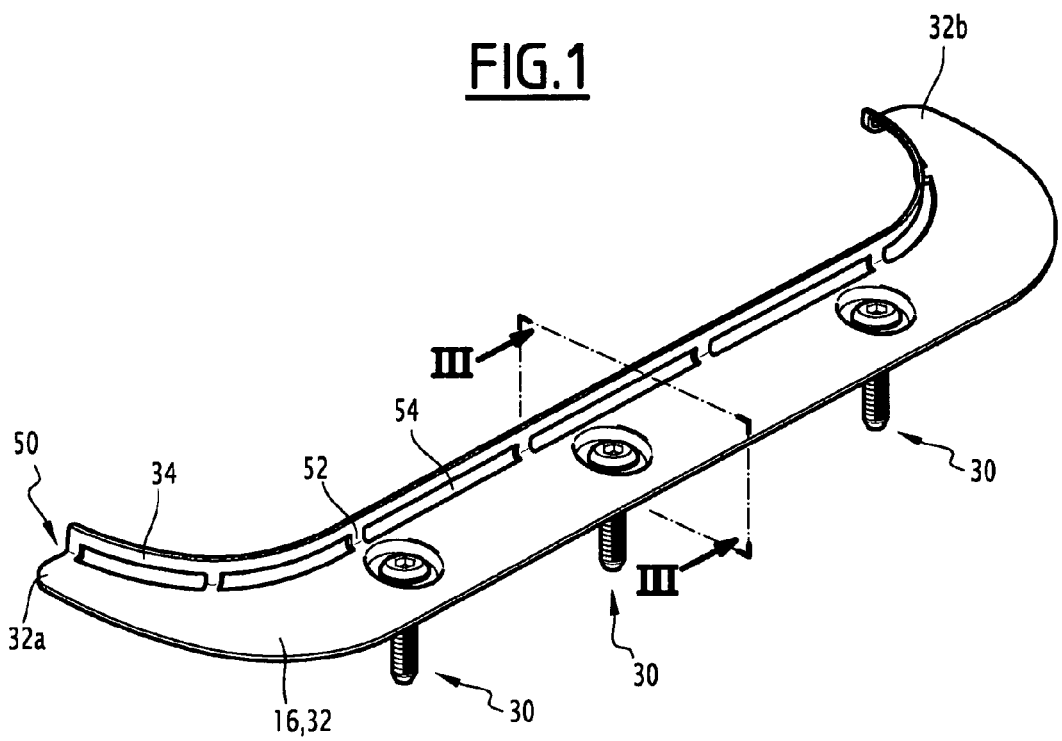
FIG. 2 is a perspective view of part of a frame of the lining element of FIG. 1.
Figure 3:
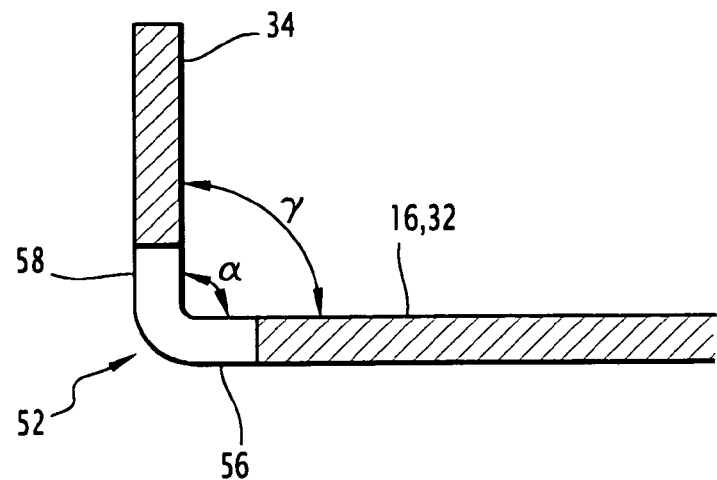
FIG. 3 is a diagrammatic cross-sectional view, along a plane marked III-III in FIG. 2.

As shown in FIGS. 2 and 3, the rib 34 is connected to the frame 16 by a weakening line 50. This weakening line makes it possible to deform the rib 34 relative to the frame 16, in the event of an impact against the lining element 10.

To that end, the weakening line 50 comprises alternating material bridges 52 and windows 54.

Each material bridge 52 connects the rib 34 to the frame 16 and is in particular integral with the rib 34 and frame 16. In particular, each material bridge 52 comprises a first portion 56 extending substantially in the extension of the frame 16, and a second portion 58 extending substantially in the extension of the base 34a of the rib 34. The two portions 56, 58 are integral and are in direct contact with each other. They form a non-zero angle α between them. The angle α is equal to the angle γ formed between the base 34a of the rib 34 and frame 16. Preferably, the angle α is comprised between 5° and 175°. In the illustrated example, the angle α is substantially equal to 90°.

Preferably, each material bridge 52 has a minimal length, between two consecutive windows 54, larger than twice the thickness of the rib 34. Furthermore, in one preferred alternative of the invention, the first portion 56 has a minimal width, between the frame 16 and the second portion 58, larger than twice the thickness of the rib 34, and the second portion 58 has a minimal width, between the rib 34 and the first portion 56, larger than twice the thickness of the rib 34. It will be noted that "thickness of the rib 34" refers to the thickness of the material of the rib 34, considered between the face of the rib 34 oriented toward the frame 16 and the face of the rib 34 oriented toward the opening 22.

In the illustrated example, each end portion 32a, 32b of the ribbed part 32 is connected by a material bridge 52 to the rib 34. Thus, the rib 34 is more rigid at those end parts 32a, 32b.

Each window 54 is delimited by the rib 34, the frame 16, and at least one material bridge 52. In the illustrated example, each window 54 is delimited by two material bridges 52, such that each window 54 has a closed contour. Alternatively, at least one window 54 is delimited by a single material bridge 52 and emerges at an end portion 32a, 32b, between the frame 16 and the rib 34.

Preferably, each window 54 has a length, considered between the two consecutive material bridges 52, comprised between 5 and 300 mm.

Owing to the invention, the rib can deform relative to the frame. In particular, in the event of an impact on the outer surface of the lining element, the pressure exerted by the covering element on the rib causes the retraction thereof toward the opening, which prevents the rib from sectioning the skin and forming a bridge protruding outward from the lining element. Thus, the rib remains covered by the skin and cannot injure the occupants of the vehicle.

Furthermore, using alternating material bridges and windows makes it possible to have an assembly made up of the frame and the ribs that is particularly inexpensive to manufacture, the weakening line being formed by a simple removal of material to form the windows.

Alternatives of the rib 34 are presented in FIGS. 4 to 9.

Figure 4:
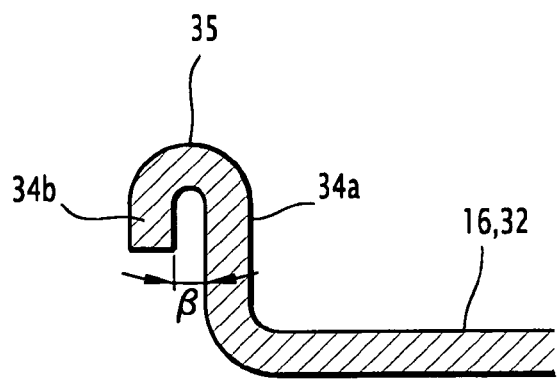
FIG. 4 is a diagrammatic cross-sectional view of a rib of the lining element, according to a first embodiment.

In a first alternative, shown in FIG. 4, the end portion 34b is folded toward the opening 22 relative to the base 34a, and the angle β is comprised between 0° and 80°.

Figure 5:
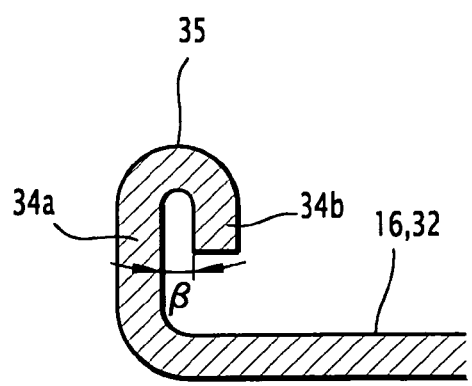
FIG. 5 is a diagrammatic cross-sectional view of the rib, according to a second embodiment.

In a second alternative, shown in FIG. 5, the end portion 34b is folded toward the frame 16, opposite the opening 22, and the angle β is comprised between 0° and 80°.

It will be noted that, in the first and second alternatives, the contact area between the base 34a and the end portion 34b defines the upper end 35 of the rib 34. However, this contact area being rounded due to the folding of the end portion 34b, the upper end 35 is not very sharp, and the risks of the rib 34 cutting the skin 26 are reduced.

Figure 6:
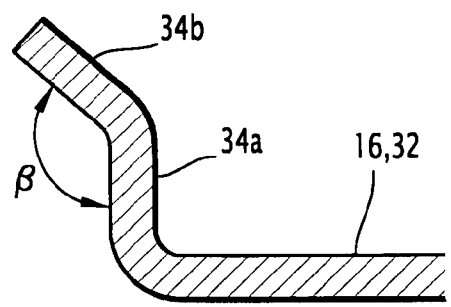
FIG. 6 is a diagrammatic cross-sectional view of the rib, according to a third embodiment.

In a third alternative, shown in FIG. 6, the end portion 34b is folded toward the opening 22, and the angle β is comprised between 100° and 175°.

Figure 7:
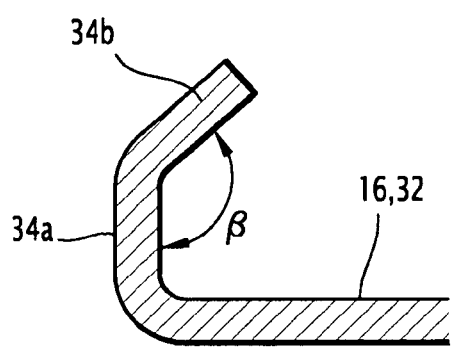
FIG. 7 is a diagrammatic cross-sectional view of the rib, according to a fourth embodiment.

In a fourth alternative, shown in FIG. 7, the end portion 34b is folded toward the frame 16, opposite the opening 22, and the angle β is comprised between 100° and 175°.

Figure 8:
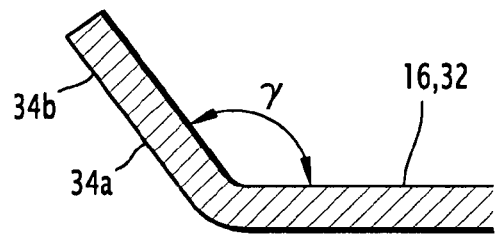
FIG. 8 is a diagrammatic cross-sectional view of the rib, according to a fifth embodiment.

In a fifth alternative, illustrated in FIG. 8, the angle γ between the base 34a and the frame 16 is comprised between 100° and 175°, preferably between 100° and 160°. The rib 34 is thus oriented toward the opening 22. Preferably, the end portion 34b extends in the extension of the base 34a, i.e., the angle β is equal to 180°.

Figure 9:
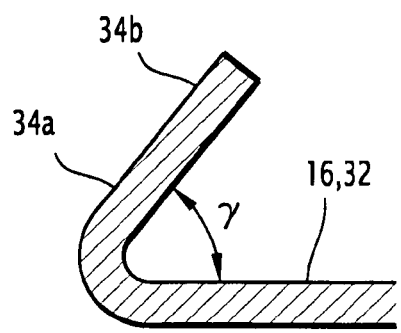
FIG. 9 is a diagrammatic cross-sectional view of the rib, according to a sixth embodiment.

In a sixth alternative, shown in FIG. 9, the angle γ is comprised between 5° and 80°, preferably between 20° and 80°. The rib 34 is thus oriented toward the frame 16, opposite the opening 22. Preferably, the end portion 34b extends in the extension of the base 34a.

In alternatives three to six, the end portion 34b forms an angle with the outer surface 28 of the lining element 10. Thus, it can easily deform in the event of an impact against the outer surface 28.

Owing to these different alternatives, the rib can more easily deform in the event of an impact against the upper surface of the lining element, and the upper end of the rib is less sharp. The risks of injuries are therefore still further reduced.

The invention claimed is:

1. A motor vehicle lining element, comprising a rigid support element and a covering element covering the support element, the covering element comprising a skin intended to be visible to an occupant of the passenger compartment of the motor vehicle, the support element defining at least one opening for the deployment of an airbag toward the outside of the lining element, a frame being connected to the support element and extending around the periphery of said opening, the frame carrying a continuous rib extending from the frame into the covering element, along at least a part of the periphery of the opening, characterized in that the rib is connected to the frame by a weakening line enabling the deformation of the rib with respect to the frame in the event of an impact against the lining element, the weakening line being formed by removal of material from the frame and from the rib.

2. The lining element according to claim 1, characterized in that the weakening line comprises alternating material bridges, connecting the rib to the frame, and windows, each window being defined by the rib, the frame, and at least one material bridge.

3. The lining element according to claim 2, characterized in that each material bridge comprises a first portion, extending substantially in the extension of the frame, and a second portion, extending substantially in the extension of the rib, the two portions being directly in contact with each other and forming a non-zero angle (α) between them.

4. The lining element according to claim 1, characterized in that the rib comprises a folded end portion.

5. The lining element according to claim 4, characterized in that an angle (β) formed between the folded end portion and a base of the rib, connected to the frame, is comprised between 0° and 80°.

6. The lining element according to claim 4, characterized in that an angle (β) formed between the folded end portion and a base of the rib, connected to the frame, is comprised between 100° and 175°.

7. The lining element according to claim 4, characterized in that the end portion is folded toward the opening.

8. The lining element according to claim 4, characterized in that the end portion is folded toward the frame.

9. The lining element according to claim 1, characterized in that the rib comprises a base connected to the frame, and in that an angle (γ) formed between the frame and the base of the rib is comprised between 5° and 80°, or between 100° and 175°.

10. The lining element according to claim 1, characterized in that the rib is connected to the frame along a peripheral edge of the frame.

11. The lining element according to claim 2, characterized in that each material bridge has a minimal length, between two consecutive windows, larger than twice the thickness of the rib.

12. The lining element according to claim 2, characterized in that the frame comprises a ribbed part bearing the rib and extending between two end portions, the rib extending from one end portion to the other end portion, each end portion being connected by a material bridge to the rib.

13. The lining element according to claim 2, characterized in that each window has a length, considered between two consecutive material bridges, comprised between 5 and 300 mm.

14. A motor vehicle lining element, comprising:
a rigid support element;
a covering element covering the support element, the covering element comprising a skin intended to be visible to an occupant of the passenger compartment of the motor vehicle, the support element defining at least one opening for the deployment of an airbag therethrough, toward the outside of the lining element;
a rigid frame connected to the support element and extending around the periphery of the opening defined by the support element; and
a continuous rib connected to the frame along at least a portion of the periphery of the opening, the rib extending from the frame into the covering element toward the skin, characterized in that the rib is made of a substantially rigid material and is connected to the frame by a weakening line enabling the rib to move with respect to the frame and to retract away from the outside of the lining element in the event of an impact against the lining element.

15. The lining element according to claim 14, characterized in that the weakening line enables the rib to retract toward the opening or toward the frame in the event of an impact against the lining element.

16. The lining element according to claim 14, further comprising a layer of foam between the support element and the skin, wherein the rib extends from the frame part way into the layer of foam.

\* \* \* \* \*